United States Patent [19]

Hill et al.

[11] 3,753,218
[45] Aug. 14, 1973

[54] ELECTRO-MECHANICAL ACOUSTIC FILTER

[75] Inventors: Otto H. Hill; Herbert V. Hillery, both of Austin, Tex.; George B. Thurston, Stillwater, Okla.

[73] Assignee: The United States of America as represented by the Secretary of the Navy, Washington, D.C.

[22] Filed: Sept. 21, 1956

[21] Appl. No.: 611,395

[52] U.S. Cl................. 340/8 R, 181/.5 F, 340/13 E
[51] Int. Cl............................................. H04r 23/00
[58] Field of Search...................... 340/5, 8, 1 B, 14; 181/35, 36

[56] References Cited
UNITED STATES PATENTS
2,405,179  8/1946  Black, Jr. et al....................... 340/8

Primary Examiner—Benjamin A. Borchelt
Assistant Examiner—Richard E. Berger
Attorney—G. J. Rubens and R. F. Hossfeld

EXEMPLARY CLAIM

1. A passive hydro-acoustic device for providing band pass filtering and detection of low frequency acoustic pressure signals transmitted through water and with said filtering occurring prior to transduction of said signals into electrical energy signals, which comprises input coupling means disposed to provide coupling of acoustic pressure signal intelligence from an external underwater sound field to the interior of said device, a fluid filled housing adapted to be closed by said input coupling means, a hydraulic tube disposed within said housing and in fluid communication with said input coupling means, means in said housing for providing a substantially enclosed air volume in hydraulic shunt relation to said input coupling means, an electrolytic detector cell for providing an electrical signal output and disposed in fluid communication with the end of said hydraulic tube remote from said input coupling means and a fluid filled chamber of substantial capacity disposed in said housing for providing said fluid communication between said hydraulic tube, said detector cell and said air volume means.

4 Claims, 5 Drawing Figures

Patented Aug. 14, 1973

INVENTORS
O. H. HILL
H. V. HILLERY
G. B. THURSTON

BY

ATTORNEYS

Patented Aug. 14, 1973

INVENTORS
O. H. HILL
H. V. HILLERY
G. B. THURSTON

BY

ATTORNEYS

ELECTRO-MECHANICAL ACOUSTIC FILTER

This invention relates generally to a hydro-mechanical acoustic filter for use in conjunction with an appropriate acoustic pressure detector for providing therewith a frequency discriminating acoustic signal detector suitable for use in underwater acoustic detection apparatus.

More particularly the device relates to a filter device for analyzing the frequency content of an acoustic signal for the presence of a particular frequency band.

Prior systems of the character described in the copending application to R. N. Lane et al, Ser. No. 579,700 filed Apr. 20, 1956 provide certain disadvantages among which are high insertion losses, the requirement for physical components too large for economical use in certain types of underwater ordance or of such a size as to be impractical in presently designed mechanisms and further that they require fluid displacement within the mechanical filter of a magnitude which is unreasonable for compact filter design.

While the filter of the device of the instant invention is in some respects similar to that described in the aforementioned copending application, a number of important changes have been provided therein which relate both to the configuration and the design parameters of the circuit, as well as the physical components of the hydro-mechanical filter.

Due to certain disadvantages inherent in the large volume take-up requirements imposed by a standard symmetrical filter system design it is proposed in the instant invention to obviate these disadvantages by resorting to unsymmetrical circuit configurations for the present model.

One method of arriving at a desired filter resides in setting up an electrical analog of the general type of circuit desired and altering the component values until the desired frequency response characteristics are obtained with a set of physically practical and realizable components. This electrical analog design makes possible the utilization of a much broader range and variety of acoustical circuitry and component values and sizes. Designs have been achieved by this method which will produce higher pressures across the detector transducer than those appearing at the input, thereby corresponding to an insertion gain for the filter-transducer combination.

It is therefore a purpose of this invention to provide an electro-mechanical filter for use with an acoustic signal detector which provides an insertion gain in the output obtained by the combination detector and filter.

One object of the instant invention resides in the provision of an improved filter system for use with an electrolytic detector which is of smaller physical size and higher efficiency than those heretofore or now in general use.

Another object of the invention resides in the provision of an acoustic filter which provides an improved discrimination for a desired band of frequencies.

Another object of the invention resides in the provision of a band pass filter, of electro-mechanical components, which is of non-symmetrical circuit configuration and overcomes the insertion losses of the systems heretofore in use, and requiring smaller space and number of parts.

In correlation with the foregoing object it is a further object to provide a filter of assymmetric characteristics providing an insertion gain from the input to the output as derived from an electrolytic detector which is simpler to construct, which provides greater ruggedness and a lesser number of parts, thereby providing a filter and detector cell assembly of a character well adapted for use in detecting mechanisms for underwater ordnance devices.

It is a further object of this invention to provide a device which overcomes all of the foregoing disadvantages of filters heretofore or now in general use while providing all of the desirable features thereof with improved selective band pass charateristics.

Other objects and many of the attendant advantages of this invention will be readily appreciated as the same becomes better understood by reference to the following detailed description when considered in connection with the accompanying drawings wherein:

FIG. 5 is a typical characteristic response curve for the filter of FIG. 1.

Figure 1:
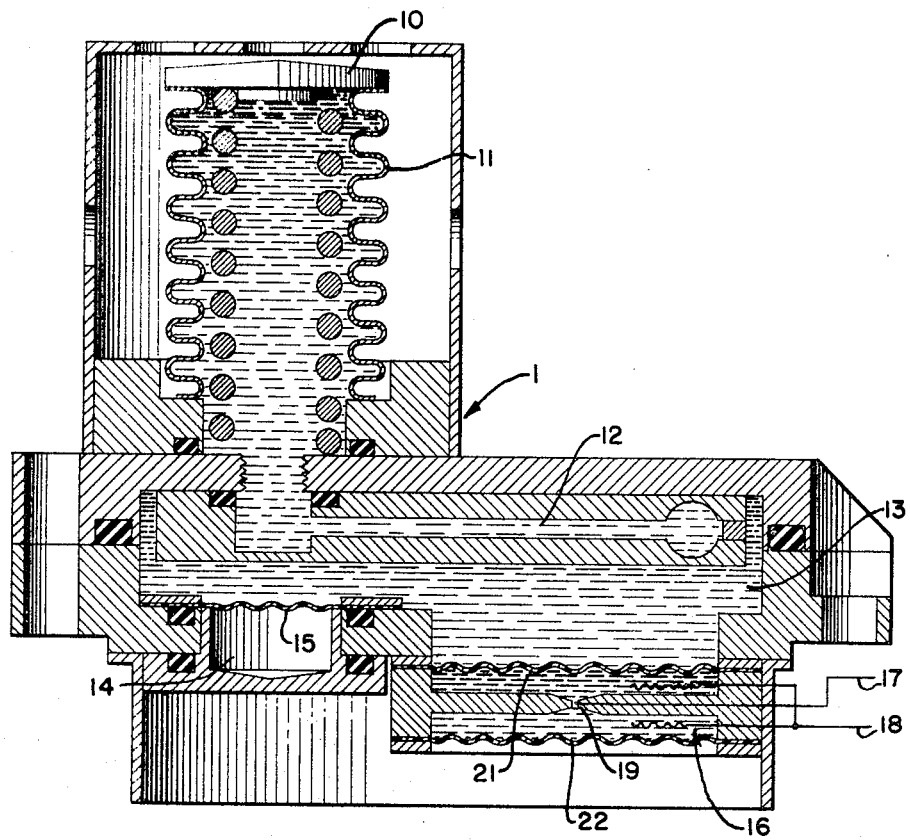
FIG. 1 is a diagrammatic illustration of a filter of one embodiment of this invention.
Figure 2:
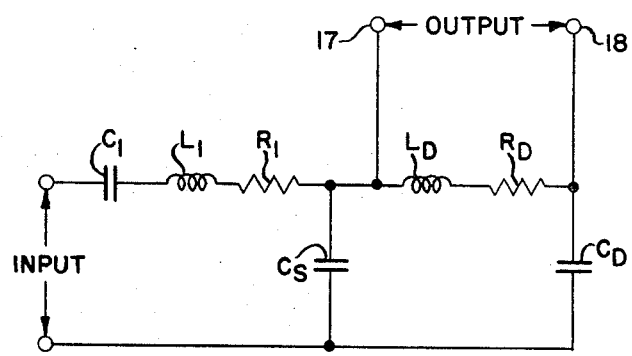
FIG. 2 is a schematic showing of the electrical analog of the hydro-mechanical filter of FIG. 1.

Referring now to FIGS. 1 and 2 of the drawings and more particularly to FIG. 1 wherein a cross sectional view of the filter indicated generally at 1 is shown corresponding to the electrical analog of FIG. 2. An acoustic pressure signal appearing across the spring backed plate 10 of the input bellows 11 and the interior of the housing not shown in which the filter is mounted is transmitted through the input arm folded tube 12 to the central chamber 3 where it then appears across both the air cavity chamber 14 as closed by diaphragm 15 and the detector transducer indicated generally at 16. The flow induced by the pressure across the detector produces an electrical output across output terminals 17 and 18 which is an appropriate function of the flow. The detector is of a character providing an electrical signal with a flow of the electrolyte through the cathode orifice 19 thereof. The structure of this detector, as enclosed by diaphragms 21 and 22, forms no part of the instant invention. The cathode orifice at 19 of the detector constitutes one arm of the acoustic filter. These detector components, as shown in FIG. 2, include the capacitance CD and the resistance and inductance of the cathode orifice indicated LD and RD. The use of the air cavity at 14 makes available a rapid and simple means for tuning the filter for appropriate response.

The spring-like action of the diaphragm 15 and the sealed air cavity enclosed thereby at 14 permits the use thereof as an acoustic compliance element in the hydro-acoustic filter. The exact value of this acoustic compliance is set by the volume of air enclosed in the sealed cavity. The volume of air is controlled by selection of the cavity to be sealed. The use of this sealed air cavity as an acoustic compliance for the hydro-acoustic filter provides an advantage in that the exact value of the acoustic compliance necessary for proper functioning of the filter can be set by a simple adjustment of the air volume, as by partially filling the chamber 14 with a chemically inert non-compliant material. A sizable volume adjustment can also be obtained by adjusting the quiescent position of the flexible plastic diaphragm separating the air from the liquid part of the filter. Also the volume of air can be adjusted by injecting a predetermined quantity of liquid into the cavity through a small port not shown which may thereafter be sealed.

Referring now more particularly to FIG. 2, the capacitance indicated at $C_i$ is the input arm capacity of the mechanical system at 11, $L_i$ and $R_i$ correspond respectively to the lumped constants of the input arm tube inductance and the input arm tube resistance. The capacitance $C_D$ as aforementioned contributes to the filtering and corresponds to the detector diaphragm lumped capacity while the lumped constants of the detector orifice inductance and detector orifice resistance are indicated respectively as $L_D$ and $R_D$. The capacitance indicated $C_s$ is the shunt connected air cavity capacitance of 14 and 15.

Figure 3:
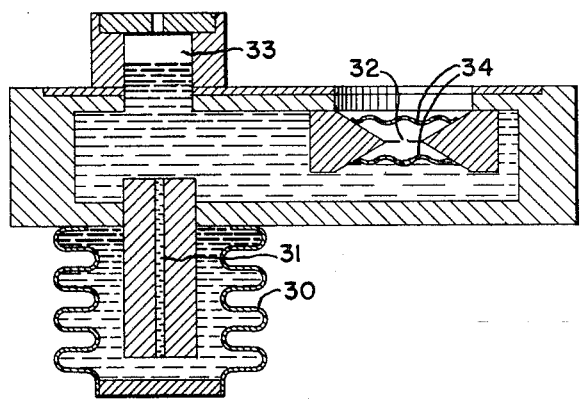
FIG. 3 is a hydro-mechanical diagrammatic illustration of an additional embodiment of the instant invention which is somewhat miniaturized over the mechanical embodiment of FIG. 1.
Figure 4:
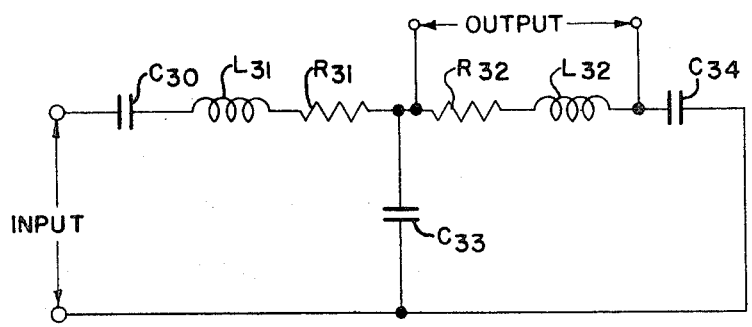
FIG. 4 is a schematic diagram of the filter of FIG. 3.
Figure 3:
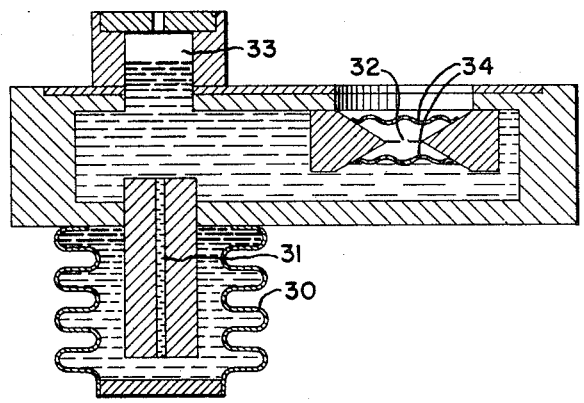
Figure 4:
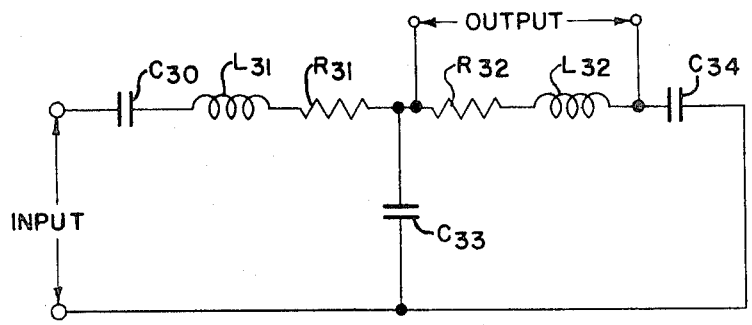

Referring now to FIGS. 3 and 4 for an alternate embodiment of the invention suitable for operation with a different frequency pass band and the analogous electrical circuit filter network, thereof, the input bellows corresponding to $C_{30}$ of FIG. 4 is shown at 30. The interior of the input bellows 30 is in fluid communication with the input tube 31, in this instance a straight hydraulic tube of predetermined length and which corresponds to the input tube inductance $L_{31}$ and input tube resistance $R_{31}$ of FIG. 4.

The air cavity 33 corresponds to the shunt capacitance $C_{33}$ and the detector diaphragm 34 correspond to the detector capacitance $C_{34}$. The hydraulic resistance and hydraulic inductance of the detector cathode orifice 32 corresponds to the inductance $L_{32}$ and resistance $R_{32}$. The foregoing will be more apparent when taken with reference to the characteristic response of FIG. 5 which is typical of the frequency attenuation which may be obtained with this type of filter. It will be thus apparent that a filter for advantageous combination with an electrolytic detecting cell has been provided, and that by electrical analysis of the analog circuits of FIGS. 2 and 4 it will be apparent that an improved mechanical design has been facilitated.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A passive hydro-acoustic device for providing band pass filtering and detection of low frequency acoustic pressure signals transmitted through water and with said filtering occurring prior to transduction of said signals into electrical energy signals, which comprises input coupling means disposed to provide coupling of acoustic pressure signal intelligence from an external underwater sound field to the interior of said device, a fluid filled housing adapted to be closed by said input coupling means, a hydraulic tube disposed within said housing and in fluid communication with said input coupling means, means in said housing for providing a substantially enclosed air volume in hydraulic shunt relation to said input coupling means, an electrolytic detector cell for providing an electrical signal output and disposed in fluid communication with the end of said hydraulic tube remote from said input coupling means and a fluid filled chamber of substantial capacity disposed in said housing for providing said fluid communication between said hydraulic tube, said detector cell and said air volume means.

2. In combination a housing means, a frequency selective hydro-acoustic filter comprising hydraulic capacitance inductance and hydraulic resistance elements and an electrolytic detector cell in fluid communication with said filter, and disposed in said housing, a shunt connected air capacitance chamber in said housing, said detector cell providing a series connected hydraulic capacitance, hydraulic inductance and hydraulic resistance for providing a symmetrical "T"-filter configuration with respect to said air capacitance and said first named filter elements, and means for obtaining a detected electrical output from said cell.

3. A hydro-acoustic pressure signal filter of predetermined band pass and frequency attenuation characteristics for providing a desired pass and range and for use with a hydro-acoustic sensitive detector having an inherent hydraulic capacity whereby an electrical signal output may be provided, which comprises a first hydraulic capacitance member disposed in series relation with one side of the filter input, means providing hydraulic inductance and resistance in series with the output side of said capacitance member, a second hydraulic capacitance disposed in shunt relation with the output side of said hydraulic inductance and resistance, means in said detector for providing a second hydraulic-resistance and inductance in series with said first named hydraulic resistance and inductance means and connected to follow said shunt connected capacitance member, the output of said filter appearing across said detector resistance and inductance, and means connecting the capacitance of said detector in shunt with the second side of said filter and the filter output connections remote from the junction connection of said first named shunting capacitance member.

4. A band pass filter and electrolytic detector of the character of claim 3 further characterized by said first hydraulic resistance and inductance means comprising a bent hydraulic tube.

* * * * *